(12) United States Patent
Palagashvili et al.

(10) Patent No.: US 9,169,017 B2
(45) Date of Patent: Oct. 27, 2015

(54) AIRCRAFT INTERIOR LIGHTING SYSTEM USING STRUCTURED MICRO LENS ARRAYS

(75) Inventors: Michael Palagashvili, Bellevue, WA (US); Timothy Todd King, Langley, WA (US)

(73) Assignee: THE BOEING COMPANY, Chicago, IL (US)

( * ) Notice: Subject to any disclaimer, the term of this patent is extended or adjusted under 35 U.S.C. 154(b) by 37 days.

(21) Appl. No.: 13/397,171

(22) Filed: Feb. 15, 2012

(65) Prior Publication Data

US 2013/0208473 A1  Aug. 15, 2013

(51) Int. Cl.
| F21V 5/00 | (2015.01) |
| B64D 11/00 | (2006.01) |
| F21W 101/06 | (2006.01) |
| F21Y 101/02 | (2006.01) |

(52) U.S. Cl.
CPC ............... B64D 11/00 (2013.01); F21V 5/007 (2013.01); F21V 5/008 (2013.01); B64D 2011/0038 (2013.01); B64D 2203/00 (2013.01); F21W 2101/06 (2013.01); F21Y 2101/02 (2013.01)

(58) Field of Classification Search
CPC ..... F21V 5/008; F21V 5/007; F21Y 2101/02; F21W 2101/06; B64D 11/00; B64D 2011/0038
USPC .................................. 362/296.1, 311.12, 471
See application file for complete search history.

(56) References Cited

U.S. PATENT DOCUMENTS

| 5,619,376 | A | 4/1997 | Kudo |
| 6,547,423 | B2 | 4/2003 | Marshall |
| 6,796,690 | B2 | 9/2004 | Bohlander |
| 6,871,981 | B2 | 3/2005 | Alexanderson |
| 7,016,470 | B2 | 3/2006 | Lawrence et al. |
| 7,033,736 | B2 | 4/2006 | Morris |
| 7,494,255 | B2 | 2/2009 | Bryan |
| 7,540,639 | B2 | 6/2009 | Clark |
| 7,593,615 | B2 | 9/2009 | Chakmakjian |
| 7,690,820 | B2 | 4/2010 | Lee et al. |
| 7,703,956 | B2 | 4/2010 | Wentland |
| 7,717,593 | B2 | 5/2010 | Clark |
| 7,717,594 | B2 | 5/2010 | Clark |
| 7,780,329 | B2 | 8/2010 | McCollum |
| 7,918,583 | B2 | 4/2011 | Chakmakjian |
| 8,011,821 | B2 | 9/2011 | Tsao |

(Continued)

FOREIGN PATENT DOCUMENTS

| DE | 202010015526 | 2/2011 |
| EP | 2418531 | 2/2012 |

(Continued)

OTHER PUBLICATIONS

Tasso R.M. Sales, "Structured Microlens Arrays for Beam Shaping", Proc. SPIE 5175, 109 (2003).

(Continued)

*Primary Examiner* — Anne Hines
(74) *Attorney, Agent, or Firm* — Weiss & Moy, P.C.; Jeffrey D. Moy

(57) ABSTRACT

An illumination system for an aircraft interior has an illumination source. An optical module is coupled to the illumination source. The optical module collects the light emissions from the light source and distributes the collected light over a desired area with a specified intensity profile.

8 Claims, 18 Drawing Sheets

(56) References Cited

U.S. PATENT DOCUMENTS

| | | |
|---|---|---|
| 8,070,328 B1 | 12/2011 | Knoble et al. |
| 2006/0039160 A1 | 2/2006 | Cassarly |
| 2007/0297171 A1 | 12/2007 | Berben et al. |
| 2009/0237943 A1 | 9/2009 | Schmidt |
| 2010/0118540 A1* | 5/2010 | Destain et al. ............ 362/293 |
| 2010/0315811 A1 | 12/2010 | Chen et al. |
| 2012/0033430 A1* | 2/2012 | Ariyoshi ............ 362/294 |

FOREIGN PATENT DOCUMENTS

| | | |
|---|---|---|
| WO | WO2012036541 | 3/2012 |
| WO | WO2012050281 | 4/2012 |
| WO | WO2012098489 | 7/2012 |

OTHER PUBLICATIONS

Tasso R.M. Sales, Stephen H. Chakmakjian, Donald J. Schertler & G. Michael Morris, "LED Illumination Control and Color Mixing with Engineered Diffusers", Proc. SPIE 5530, 133 (2004).

G. Michael Morris, Tasso R.M. Sales, Stephen Chakmajihan & Donald J. Schertler, "Engineered Diffusers for Display and Illumination Systems: Design, Fabrication and Applications", University of California, Irvine, http://www.physics.uci.edu/~isis/Yountvill/Sales.pdf (2006).

Liwei Sun, Shangzhong Jin & Songyuan Cen, "Free-form Microlens for Illumination Applications", Appl. Opt.48, 5520-5527 (2009).

* cited by examiner

AIRCRAFT INTERIOR LIGHTING SYSTEM USING STRUCTURED MICRO LENS ARRAYS

BACKGROUND

Embodiments of this disclosure relate generally to lighting systems, and more particularly, to an interior illumination and lighting system for passenger cabins in airplanes using micro lens array optics.

In the past, conventional passenger aircraft illumination systems may have used fluorescent and incandescent light sources. However, light emitting diode (LED) based lighting systems may offer several advantages over such conventional systems. These may include smaller source size, lower electrical power consumption, lower weight, and longer operating lifetimes. Thus, presently, many passenger cabins may use illumination systems based on LEDs.

Typical airplane cabin architecture use elongated shapes arranged longitudinally in a manner of continuous strings. It is desirable in the general cabin lighting to have a uniform illumination of the architectural elements. Existing general lighting systems found in the aircraft main cabin may be designed to match architectural features dimensionally in order to achieve a uniform illumination of a desired pattern. Thus existing general lighting applications may make use of continuous linear arrangements of multiple elongated fixtures each of which is based on linear arrays of numerous LEDs.

Aircraft interior lighting usually includes dedicated lighting applications such as task and area lighting. These applications generally utilize mostly spot and flood types of lighting fixtures shining on a specific area or isolated target. Another type of lighting applications is feature lighting. These applications often require complex illumination patterns or close match between the light beam shape and illumination target. Both dedicated and feature lighting may use single LED designs as well as arrays of plural LEDs depending on specific function of the fixture.

All cabin lighting applications assume certain degree of collection of light radiation from the source and redirection of the light towards the illumination target.

Present designs of LED fixtures used in the aircraft interior illumination provide limited control over the spatial distribution of light, which may result in light radiated in undesired directions. Such unwanted light is usually blocked and therefore lost for the purpose of illumination. This loss of light output may need to be compensated by oversizing the lighting system which may lead to increase in weight, cost and energy consumption. Furthermore, the design based on linear LED array may impose certain limitation on the cabin architecture and may increase costs due to the dimensional dependence between a fixture and underlying structural element to which that fixture is attached.

Another implication of the limited control over spatial distribution of light may be inadequate illumination pattern such as uneven light level, dark and hot spots, superfluous illumination. This inadequacy may be especially detrimental for the dedicated and feature lighting applications. One prominent example is a passenger reading light that produces excessively wide light cone that may encroach in to other passengers' space.

Therefore, it would be desirable to provide a system and method that allows for better utilization of a light output produced by a LED source.

SUMMARY

An illumination system for an aircraft has an illumination source. An optical module is attached to the illumination source for collection of light emissions from the illumination source and distribution of the collected light emissions over a desired distribution profile.

An illumination system for an aircraft has a Light Emitting Diode (LED) module. An electronic module is coupled to the LED module to power and control the LED module. An optical module is coupled to the LED for collection of light emissions from the LED and distribution of the collected light emissions over a desired area.

An illumination system for an aircraft has a plurality of light fixtures. Each light fixture has an illumination source. An optical module is coupled to the illumination source for collection of light emissions from the illumination source and distribution of the collected light emissions over a desired area.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
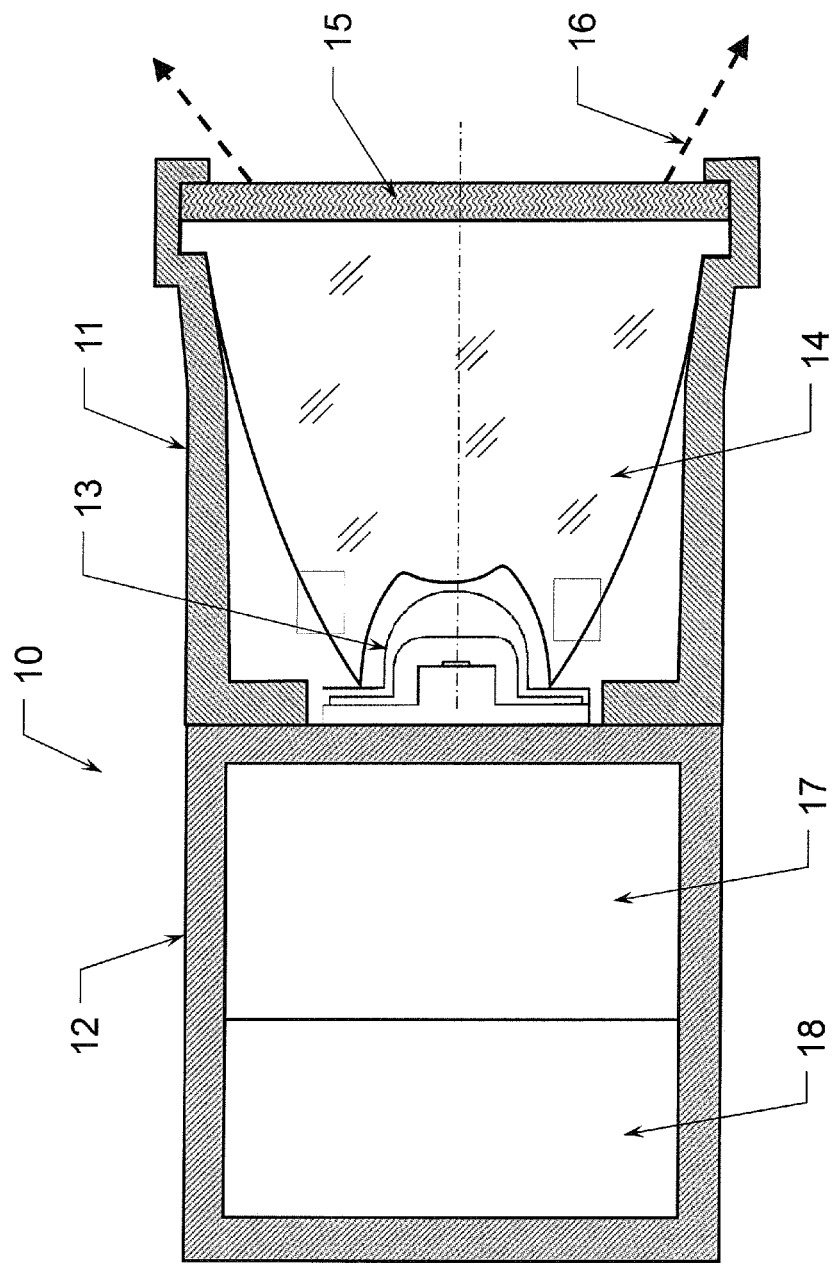
FIG. 1 is a simplified cross-sectional view showing a compact LED fixture design utilizing a Structured Micro Lens Array (SMLA) in conjunction with collimator.

Referring to FIG. 1, an LED lighting fixture 10 (hereinafter fixture 10) may be shown in a simplified cross-section view. The fixture 10 may be comprised of an electronic module 12 and an optical module 11. The purpose of division of the fixture 10 in to modules 11 and 12 is to separate a stable portion of a design represented by an electronic module 12 from an adaptive portion represented by an optical module 11. The electronic module 12 may be used to power and control a light source 13. The light source may be in a form of a high-output LED package 13. The electronic module 12 may include an LED driver component 17 which may be used to power and control the LED package 13 and a communication component 18 which may be used to send signals to and from the fixture 10.

The optical module 11 may be used to shape a light output 16 in a manner pertinent to a specific application. The optical module 11 may be attached to the electronic module 12 through a standardized mechanical interface. Thus the optical module 11 may be customized to a specific application independently from the electronic module 12. The optical module 11 may contain one or more lenses. In FIG. 1, the optical module 11 may have a collimator 14 and a SMLA component 15. The collimator 14 may be used to collect the light emissions from the LED package 13 and aligning them in to a beam with little or no divergence. SMLA component 15 is a particular type of micro lens optical device. Some SMLA designs may be capable of homogenizing and redirecting incoming light with minimal losses. At least two categories of SMLA technology may be used in the fixture 10. One category is represented by Engineered Diffuser™ available from RPC Photonics Inc. Another category is represented by MicroLens™ available from Rambus Inc. The former category may require well collimated light input in order to produce a high quality output. The latter is used in conjunction with an OWG, which is usually a rod, a bar, a plate, or other elongated shape with smooth parallel surfaces made of an optical grade material. Both technologies are capable of homogenizing and shaping the light output with a desired directionality and distribution within broad range of angles. The collimator 14 and the SMLA 15 portions of an optical system may be manufactured as one solid piece.

Recent advances in solid state lighting technology brought to the market a number of high-output, yet reliable, and efficient LED components. Such LEDs may be used as a light source for the compact lighting fixture 10 described herein. Some examples of high-output compact LED fixtures for exterior aircraft lighting include those produced by AeroLEDs™, Emteq®, and other manufacturers.

The use of a high-output LED package 13 combined with SMLA technology described above may allow for creation of a compact lighting fixture 10 that may fit into a smaller spatial envelope, would be lighter weight, higher efficiency, and simpler design as compared to existing fixtures based on linear arrays of numerous LEDs. Further, SMLA technology may significantly expand capabilities and improve performance of existing designs based of singular LEDs.

The LED package 13 may contain a single-die or multi-die LED. Also, three or more single-die LEDs may be combined in one fixture. One singe-die LED fixture may be used for applications where no change or high consistency of color is required. One example of such application may be a personal reading light. Multi-die LED or several LEDs in one fixture may be used to produce a light output with variable color or with stabilized calibrated color. The use of a fixture 10 capable of a variable color light output may allow one to provide mood lighting system for the aircraft cabin.

Figure 2:
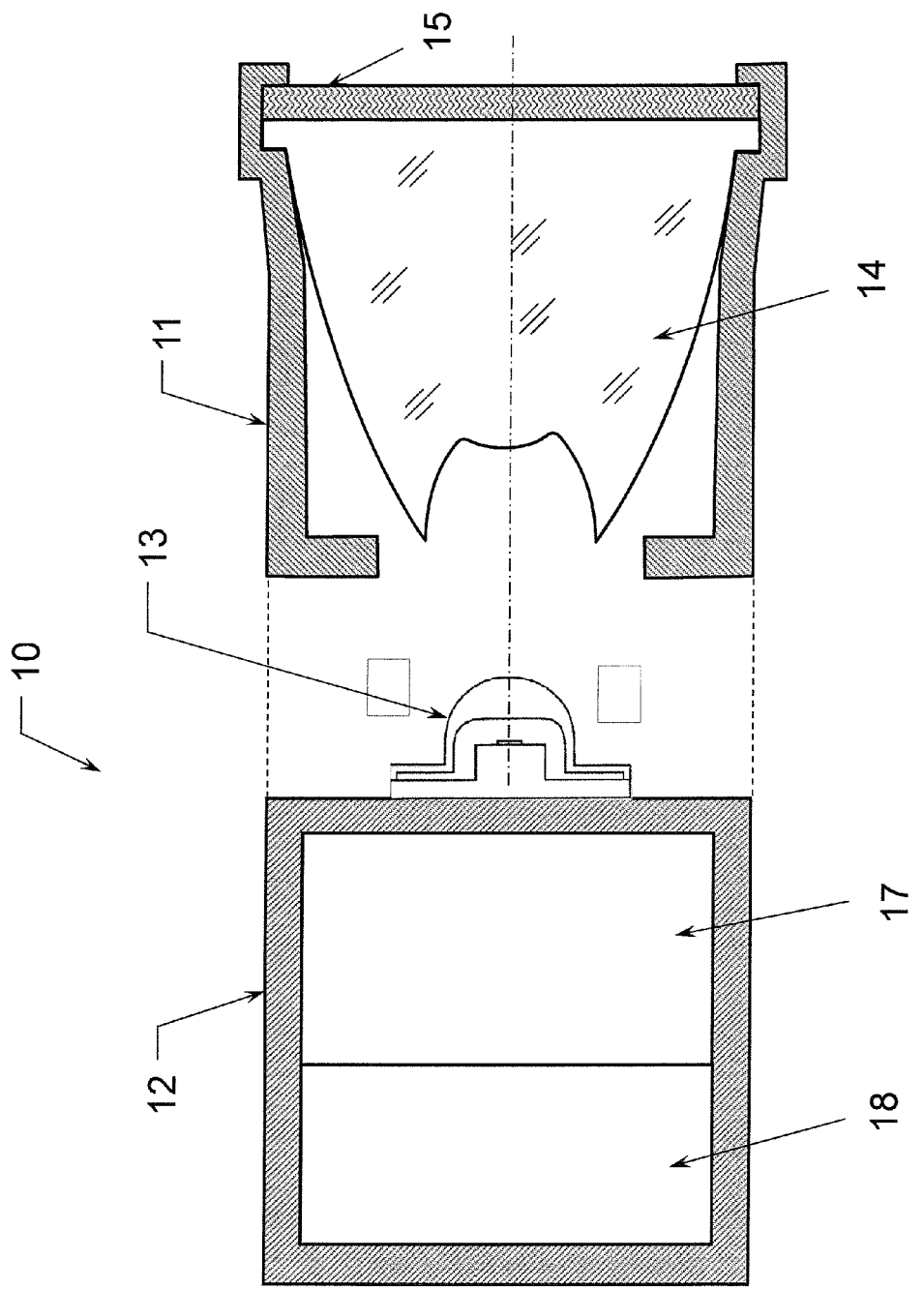
FIG. 2 is a simplified block diagram showing a modular design that divides a lighting fixture in to electronic and optical modules where the LED package is part of the electronic module.

Referring now to FIG. 2, fixture 10 is shown with the optical module 11 detached from the electronic module 12. It may be desirable to have the LED package 13 as a part of the electronic module 12. Together, LED package 13 and electronic module 12 may make up a light generation module that may produce a raw light output. Optical module 11 may need to be cohesive with a particular type of the LED package 13. Such cohesion may be essential for standardized interface between an adaptive design of the optical module 11 and a stable design of the electronic module 12.

Figure 3:
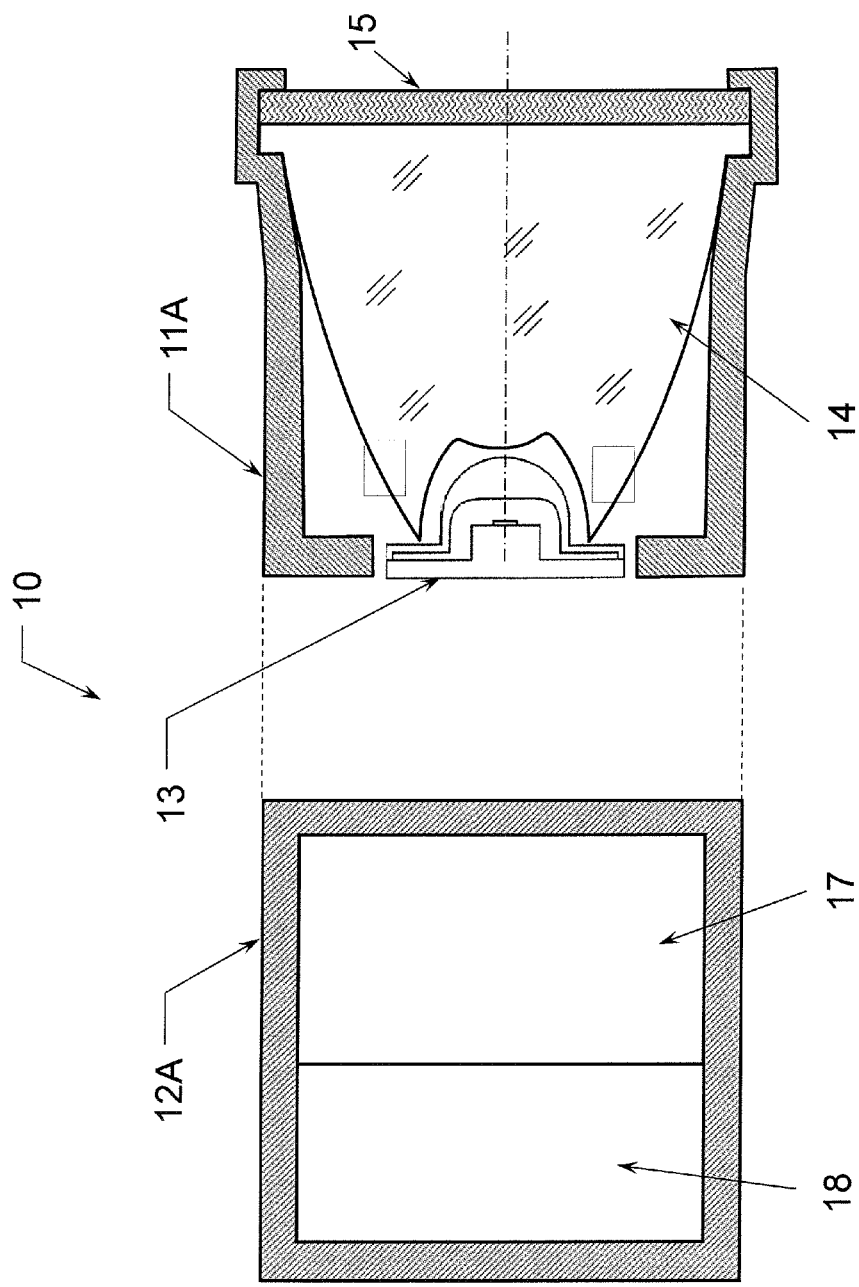
FIG. 3 is a simplified block diagram showing a modular design that divides a lighting fixture in to electronic and optical modules where the LED package being a part of the optical module.

Referring now to FIG. 3, similarly to FIG. 2, fixture 10 is shown with the optical module 11A detached from the electronic module 12A. It may be desirable to have the LED package 13 as a part of the optical module 11A. Together LED package 13 and optical module 11A may make up a complete light source with final output pertinent to a specific application. Electronic module 12A may need to be cohesive with a particular type of the LED package 13. Such cohesion may be essential for standardized interface between an adaptive design of the optical module 11A and a stable design of the electronic module 12A.

Figure 4:
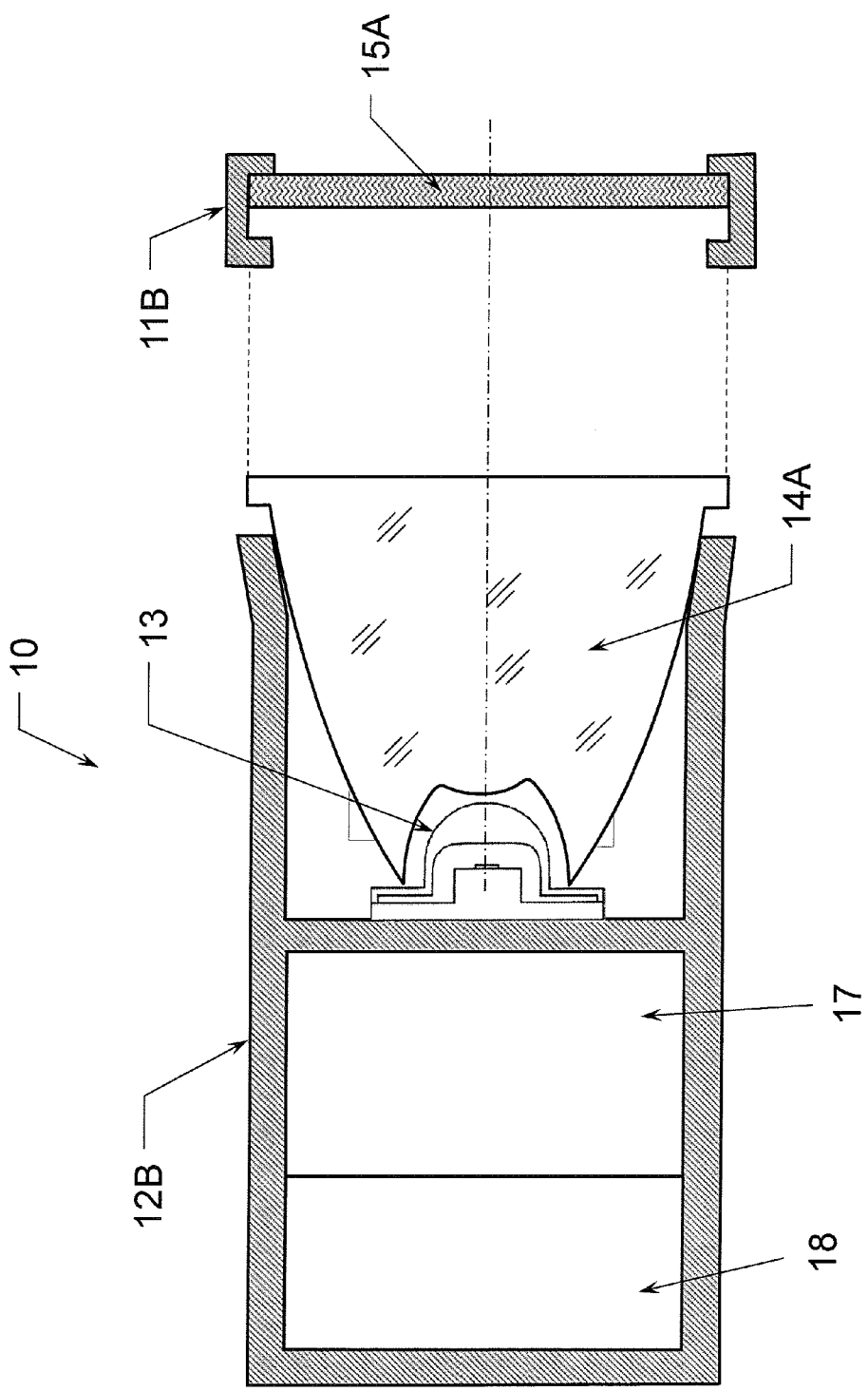
FIG. 4 is a simplified block diagram showing a modular design that divides a lighting fixture in to light generation and light transformation modules whereas light transformation module includes only SMLA portion of the optical system.

Referring now to FIG. 4, the adaptive portion of the fixture 10 may be represented by SMLA 15A alone. This embodiment assumes a modular design that divides fixture 10 in to light generation module 12B and light transformation module 11B. Light generation module 12B may comprise all the electronics including LED package 13 along with collimator 14A. The module may be able to produce a collimated light beam of a desirable color composition and intensity. Light generation module 12B generally would have a stable design. The light transformation module 11B may include SMLA 15A. The light transformation module 11B may homogenize and shape the light beam produced by the light generation module 12B. The light transformation module 11B may have adaptive design. Both modules 11B and 12B may have standardized physical interface with each other.

Figure 5:
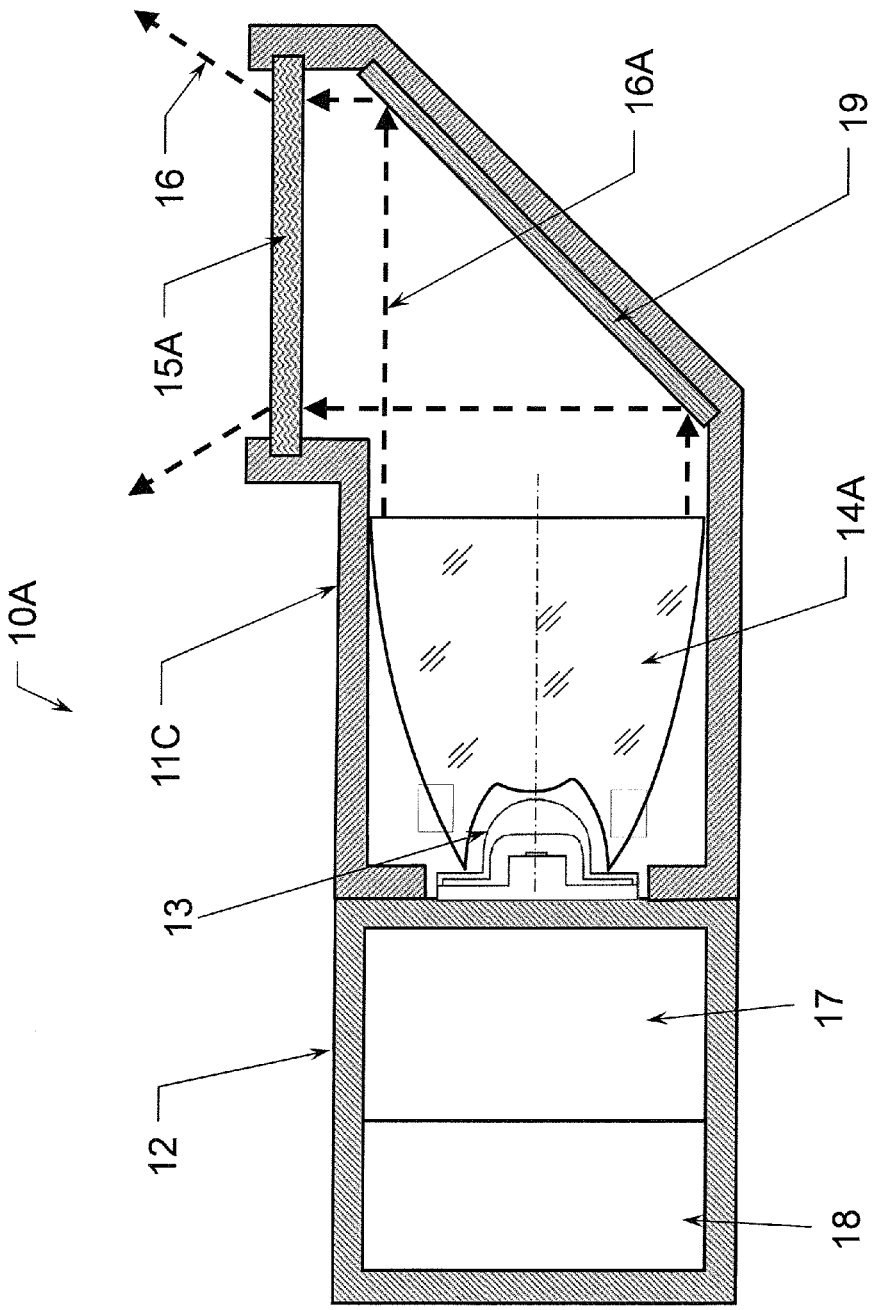
FIG. 5 is a simplified block diagram showing a variant of a compact LED fixture design with a redirecting mirror placed between the collimator and SMLA.

Referring now to FIG. 5, in accordance with one embodiment, SMLA 15A may be spatially separated from the collimator 14A and placed at an angle to the axis of the collimator 14A. Resulting fixture 10A may be suitable for certain configurations that do not provide sufficient room in a lengthwise direction. Such fixture design may include a reflective element 19. The reflective element 19 may be a mirror or like element. The mirror 19 may be used and positioned to redirect the collimated beam 16A exiting the collimator 14A towards the SMLA 15A that would in turn produce a desired light output as described above. Fixture 10A can be divided in to functional modules 12 and 11C similarly to either configuration shown in FIG. 2, 3, or 4.

Figure 6:
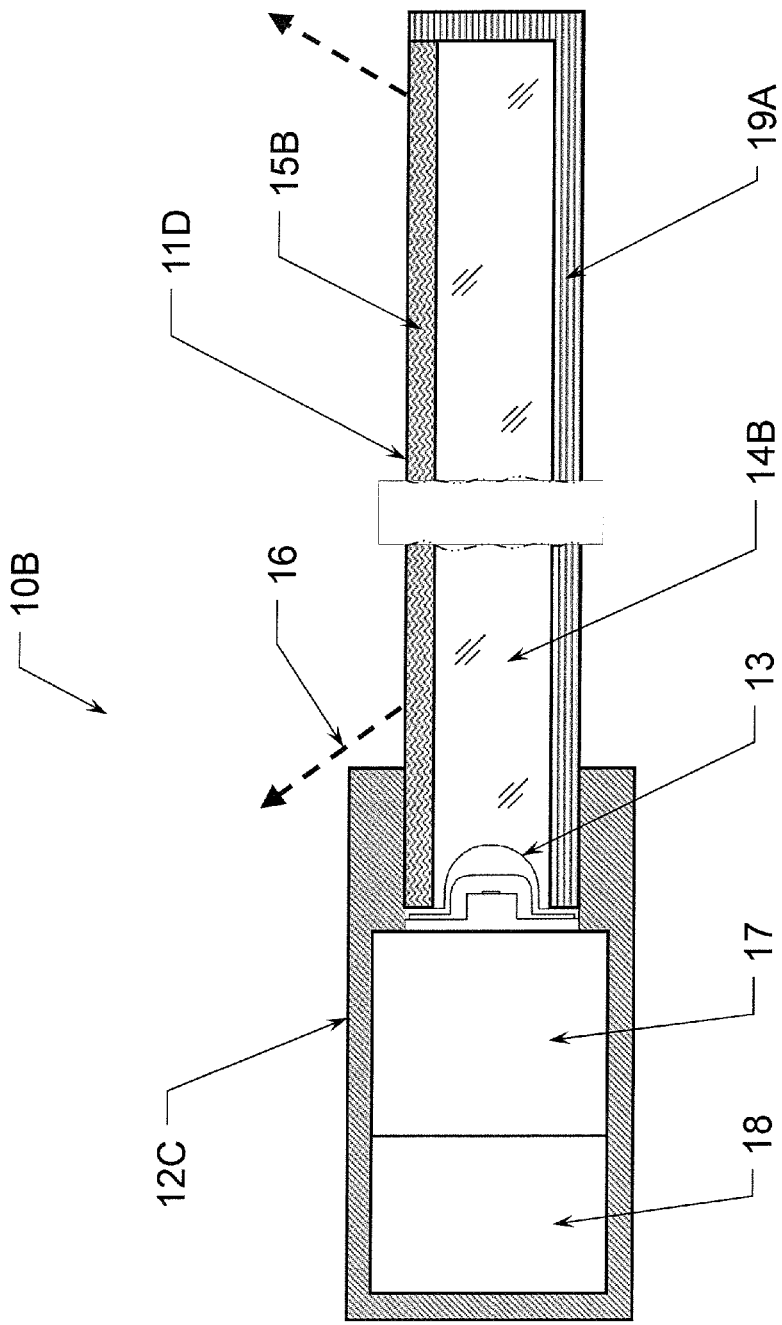
FIG. 6 is a simplified cross-sectional block diagram showing a LED fixture design utilizing SMLA in conjunction with a optical wave guide (OWG)
Figure 7:
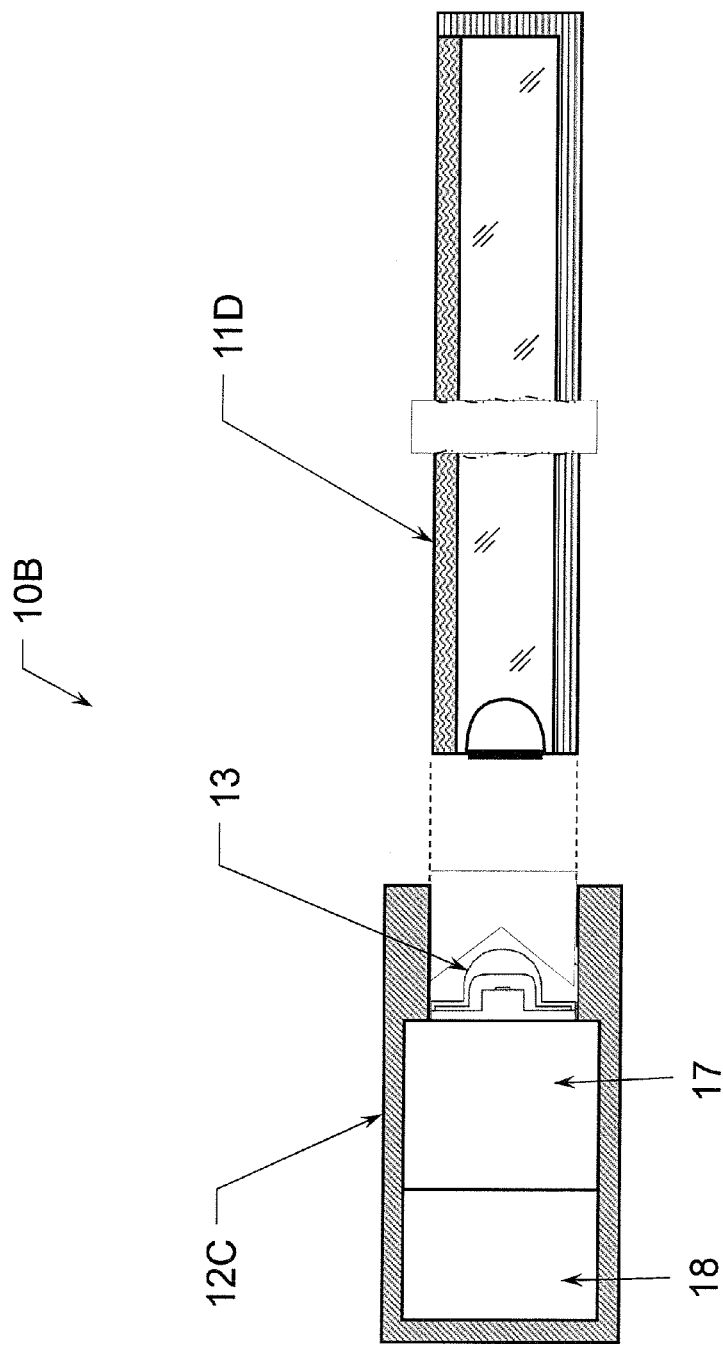
FIG. 7 is similar to FIG. 2 wherein an OWG type of fixture is shown.
Figure 8:
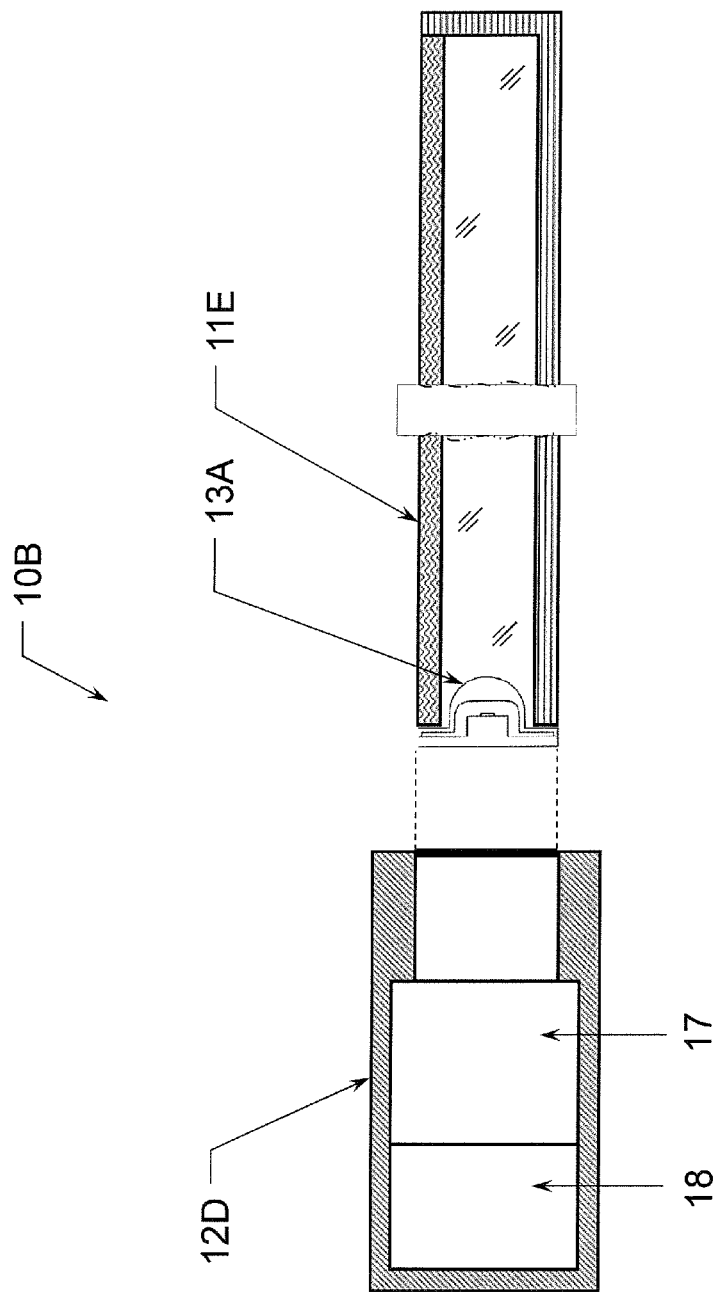
FIG. 8 is similar to FIG. 3 wherein an OWG type of fixture is shown.
Figures 9A, 9B:
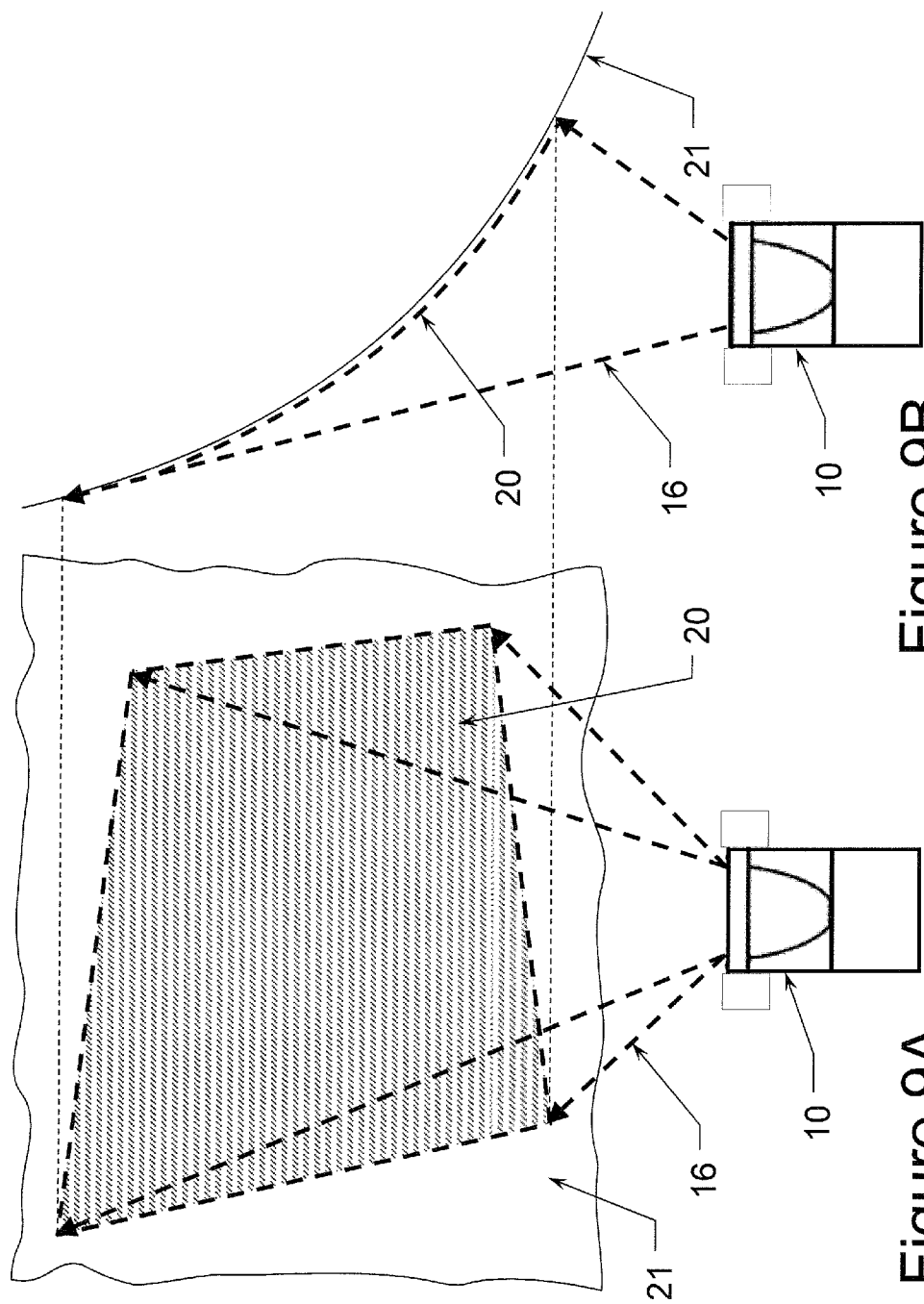
FIG. 9A-9B are diagrams showing general concepts of illumination using a compact LED lighting fixture with SMLA.
Figures 10A, 10B:
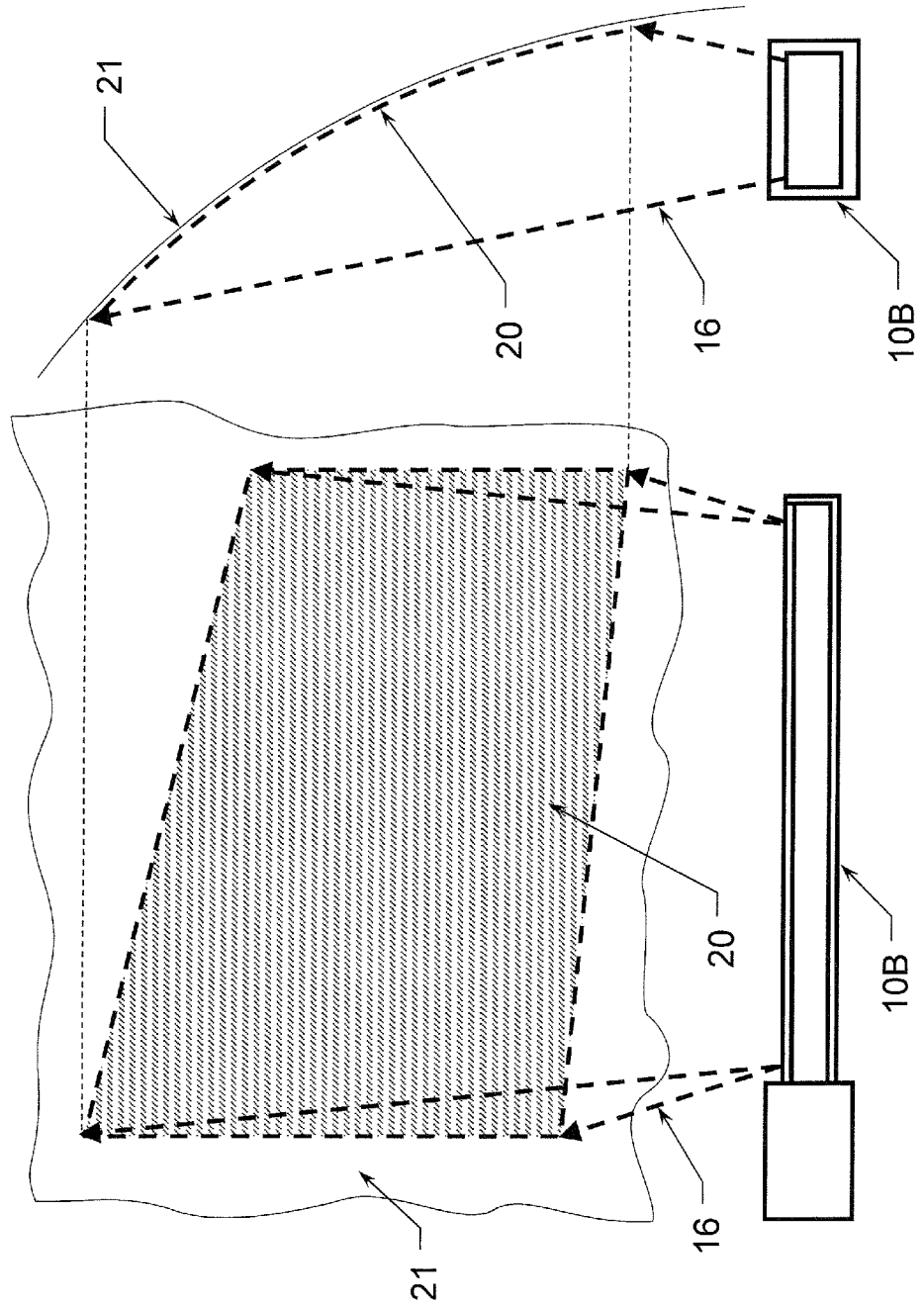
FIG. 10a-10B is similar to FIGS. 9A-9B wherein the wave guide type of LED fixture in shown.
Figure 11:
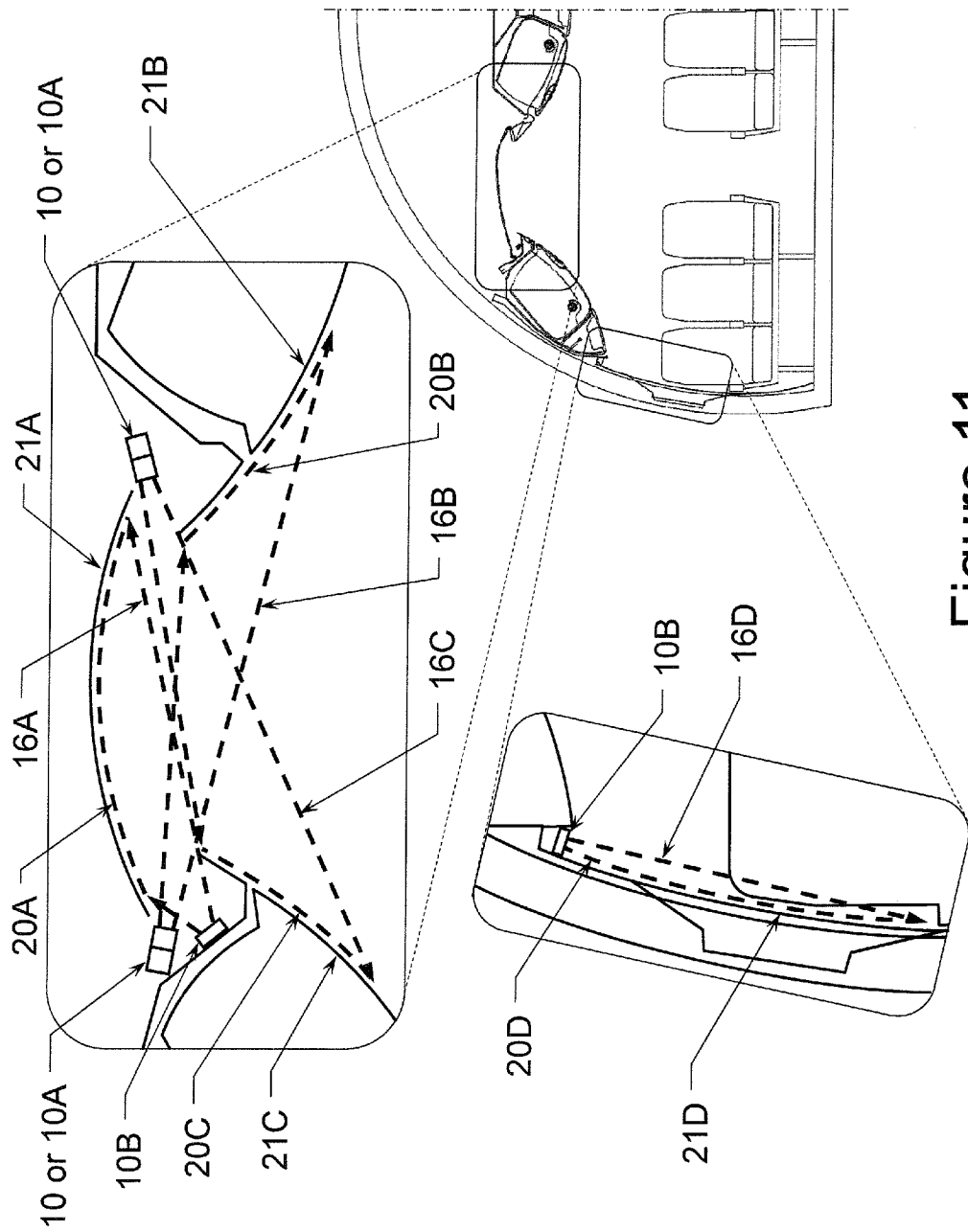
FIG. 11 is a diagram showing simplified cross-sectional view of an aircraft passenger cabin with magnified detailed depictions of a typical arrangement of lighting fixtures for general lighting applications.
Figure 12:
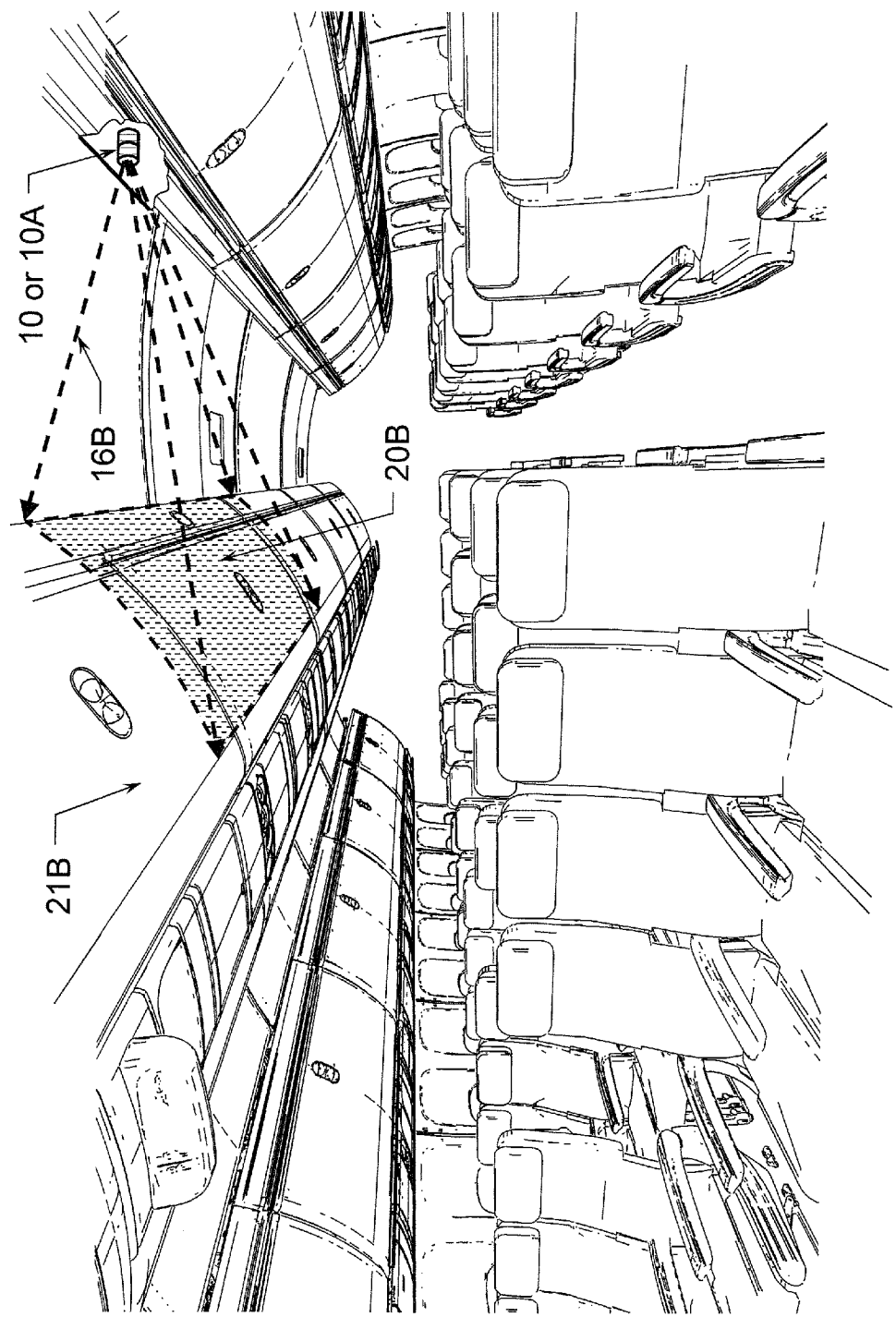
FIG. 12 illustrates one embodiment where a compact LED fixture with micro lens optics is used for cross-bin illumination.
Figure 13:
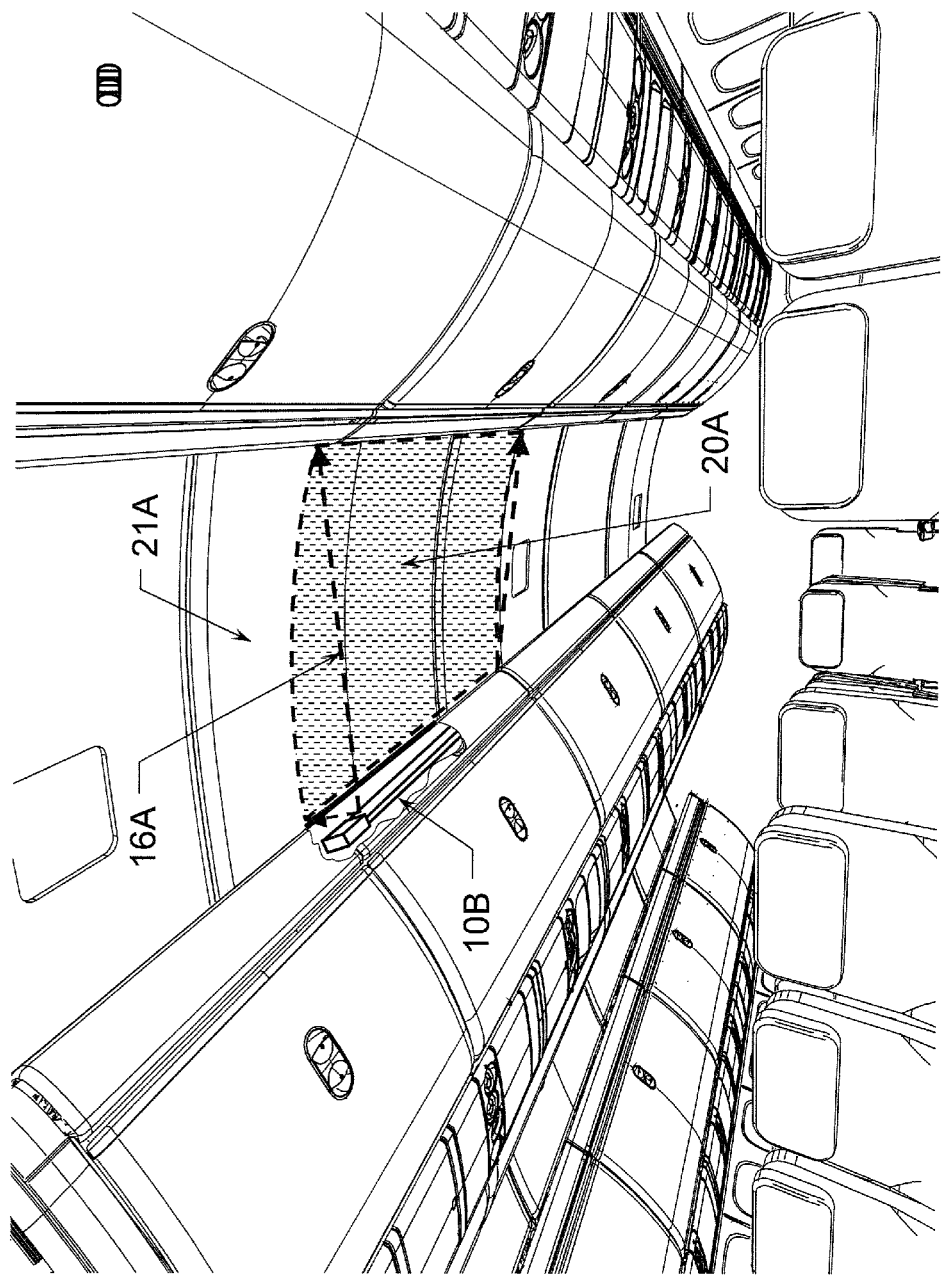
FIG. 13 illustrates one embodiment where a wave guide type of LED fixture with micro lens optics is used for ceiling wash lighting.

Referring now to FIGS. 6, 7, and 8, a fixture 10B is represented. The fixture 10B may be comprised of an electronic module 12C and optical module 11D. Both modules 12C and 11B may each have the same basic function as those described for electronic modules 12-12B and optical modules 11-11C above. In the embodiments shown in FIGS. 6-8, the optic module 11D may employ an OWG element 14B instead of a collimator. The OWG element 14B may be used to contain the light produced by an LED package 13 and to pass it on to SMLA element 15B. SMLA 15B may then create a well-defined light output 16 similarly to the above descriptions. Faces of the OWG 14B opposite to the LED package 13 and to the SMLA 15B can be plated by a reflective coating 19A to alleviate light loss.

Analogously to FIGS. 2 and 3, FIGS. 7 and 8 further illustrate a functional division of the fixture 10B. In FIG. 7, the fixture 10B is divided in to an electronic module 12C and optical module 12D. While in FIG. 8, the fixture 10B is divided into an electronic module 12D and an optical module 11E. This modular approach has same purpose and follows same principals as described above.

The use of micro lens technology as exemplified by the fixtures 10-10B and its variants may allow creation of virtually unlimited number of illumination patterns with different colors and light intensity profiles. The cabin lighting system comprised of the fixture types described above may be highly efficient in terms of energy consumption, light in weight, and cost efficient in production and operation. The capabilities of contemporary solid state lighting combined with micro lens technologies in the compact design of the fixtures 10-10B and its variants described herein may allow for replacement of existing costly, heavy and bulky linear arrangements. Flexibility of the micro lens technology may allow for greater enhancement of passenger cabin aesthetics and may lead to new lighting applications. Further, the modular implementation of the compact design separating electronics from optics may help to reduce production cost.

Referring now to FIGS. 9A-10B, a general concept of illumination using compact fixture with micro lens optics is shown. The fixture 10 (FIGS. 9A-9B) and 10B (FIGS. 10A-10B) produces a well defined light output 16 that may create a pre-determined illumination pattern 20 on a target surface 21. One can see that geometry of the surface 21 and a position of the lighting fixture 10 (FIGS. 9A-9B) and 10B (FIGS. 10A-10B) relative to the surface 21 can be fairly arbitrary and independent of a particular pattern 20 that needs to be created. In other words, micro lens optics may be capable of creating virtually any illumination pattern on any surface from any position of the fixture.

Figure 14:
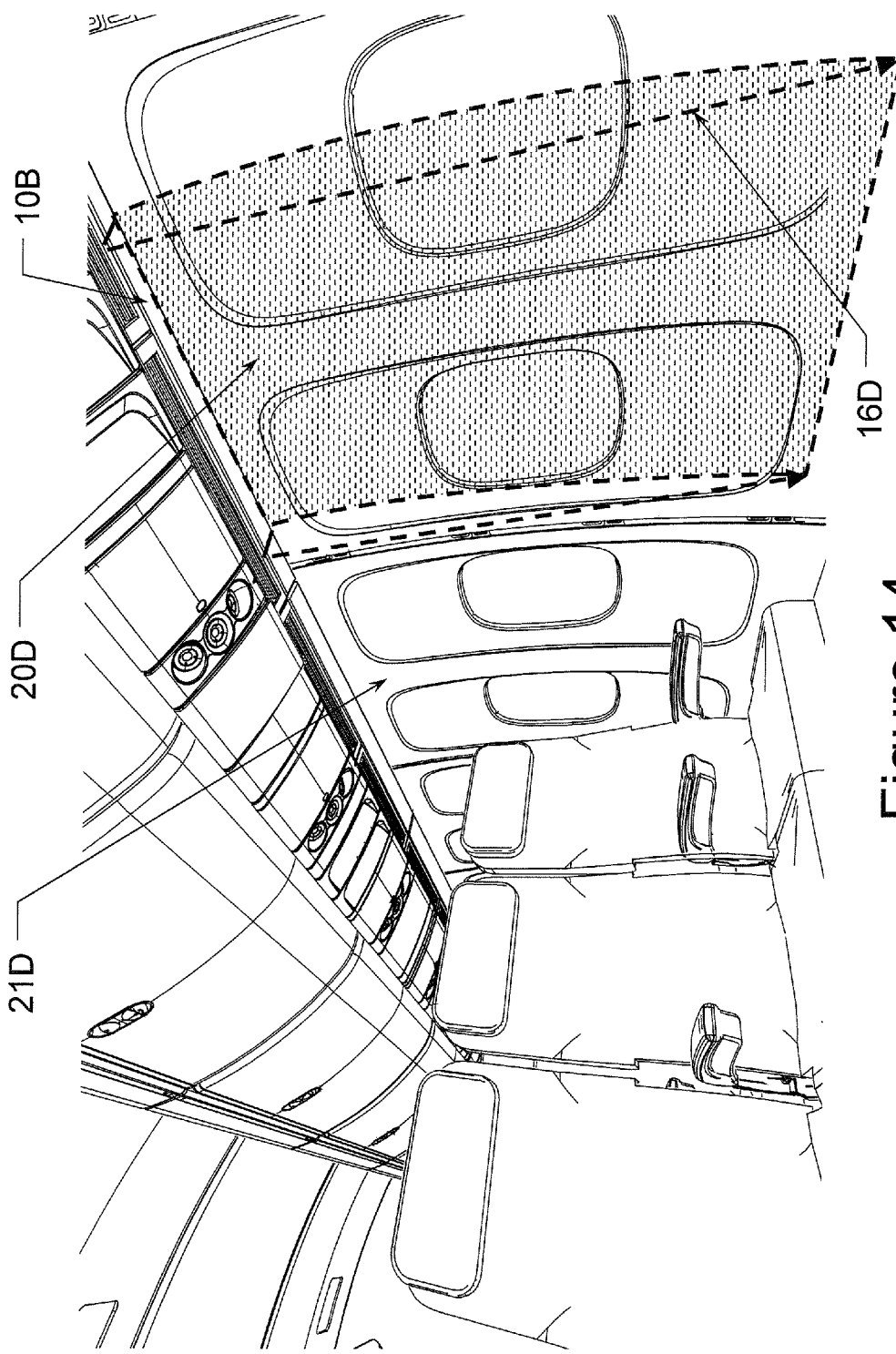
FIG. 14 illustrates one embodiment where a wave guide type of LED fixture with micro lens optics is used for side wall wash lighting.

Referring now to FIGS. 11-14, some general cabin lighting applications are illustrated. At least three embodiments are shown here as follows: ceiling panel surface 21A may be illuminated by a fixture 10B producing light output 16A that may result in ceiling wash lighting depicted as pattern 20A (FIG. 11); inboard 21B and outboard 21C overhead storage surfaces may be illuminated by fixtures 10 or 10A producing light output 16B and 16C respectively that may result in so-called cross-bin lighting depicted by patterns 20B and 20C respectively (FIG. 12-13); side wall surface 21D may be illuminated by the fixture 10B producing light output 16D that may result in side wall wash lighting depicted as pattern 20D (FIG. 14). Use of multiple fixtures positioned a certain distance apart from each other and creating slightly overlapping patterns may create a continuous illumination effect equivalent to that obtained from existing linear fixture arrangements.

Figure 15:
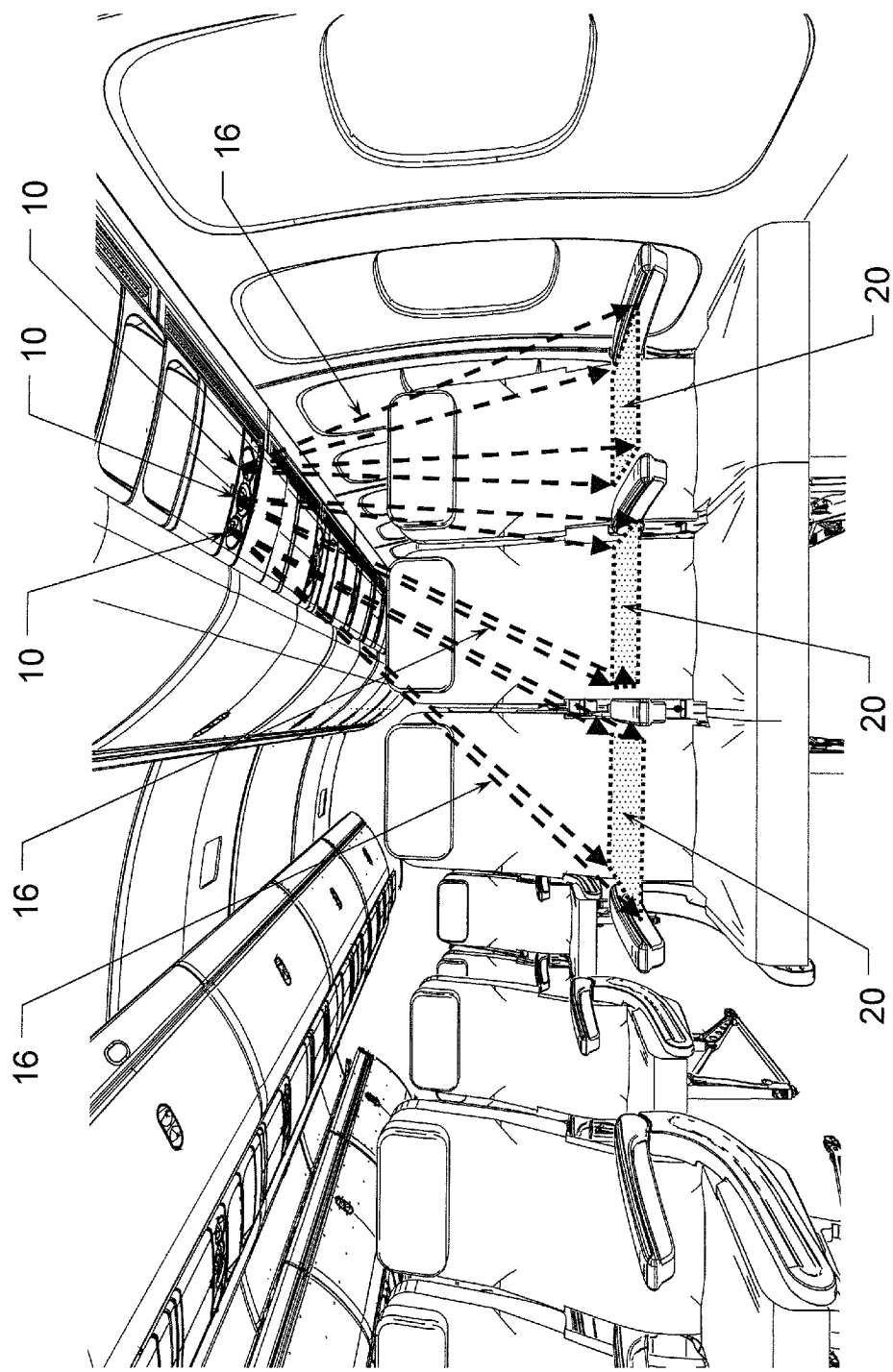
FIG. 15 illustrates one embodiment where compact LED fixtures with micro lens optics are used as personal reading lights.

Referring now to FIG. 15, it may be desirable to create a personal reading light producing a spot that covers maximum area without encroaching into adjacent passenger spaces. According to one embodiment of this invention it may be possible to solve this problem with help of the compact fixture described above. The FIG. 15 shows a typical group of passenger seats each illuminated by a fixture 10 in the capacity of a reading light. Light output 16 from each fixture 10 may be individually shaped to create a rectangular light spot 20 that would not creep beyond a target seat space. It should be noted that a position of the reading light relative to a seat is repetitive from row to row for the most of the aircraft cabin. Thus configuration described herein would require only few variants of SMLA component to cover all possible positions.

Figure 16:
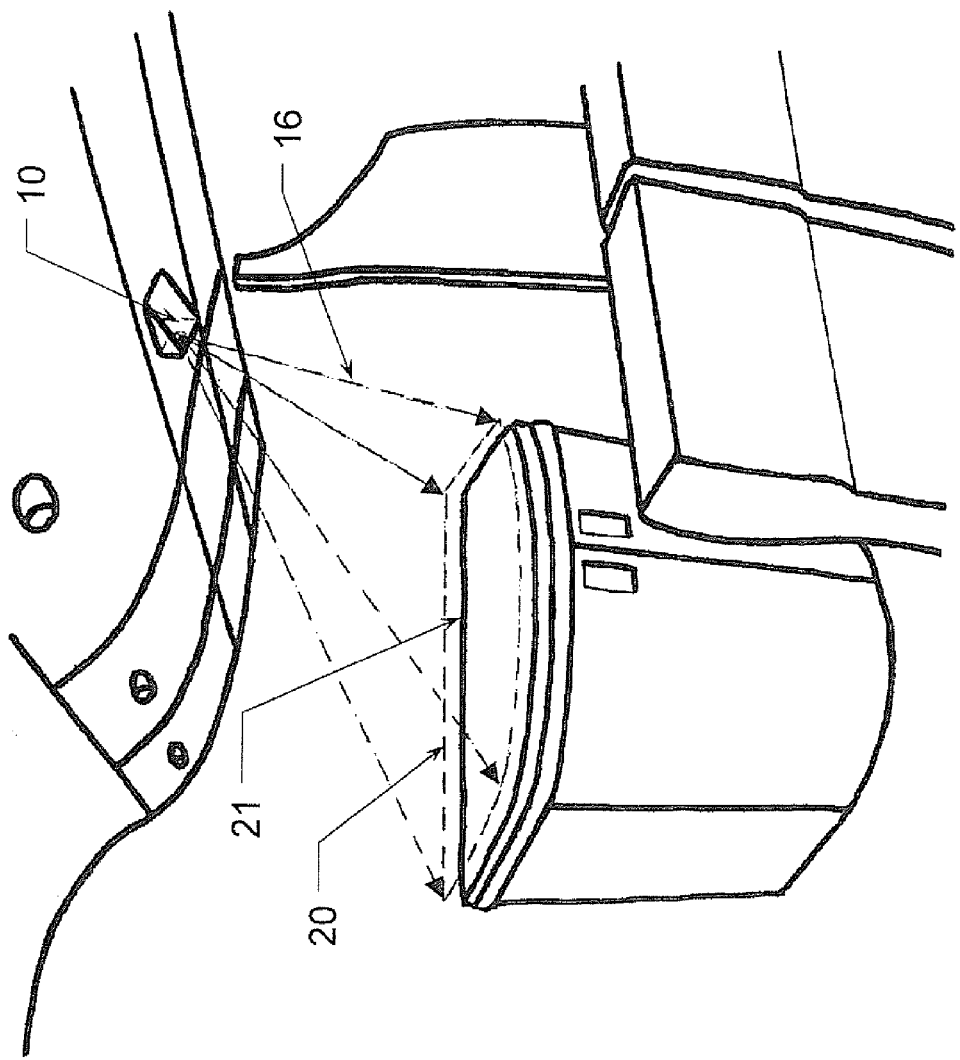
FIG. 16 illustrates one embodiment where a compact LED fixture with micro lens optics is used as a work light shining on a cabinet countertop.
Figure 17:
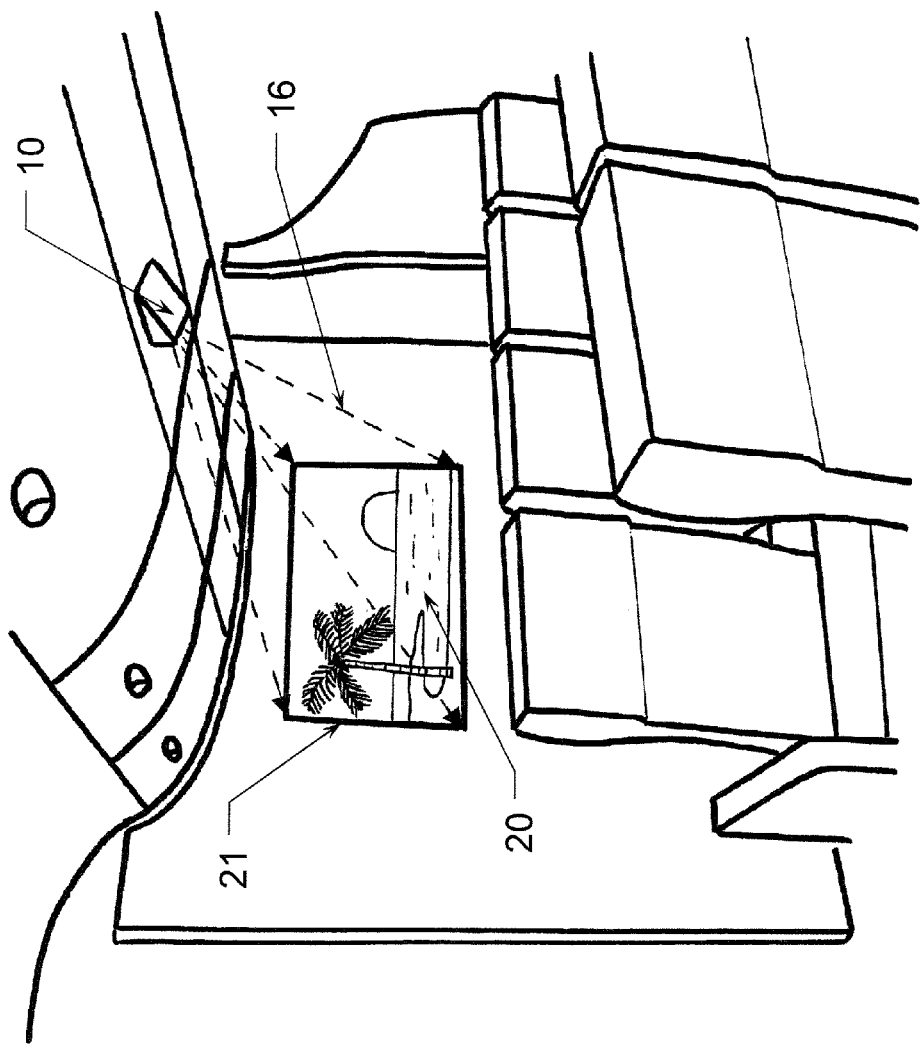
FIG. 17 illustrates one embodiment where a compact LED fixture with micro lens optics is used for artwork illumination.

Referring now to FIGS. 16 and 17, at least two embodiments pertaining to dedicated lighting applications are illustrated. FIG. 16 shows fixture 10 in a capacity of a typical work light shining on a cabinet countertop. This embodiment has the advantage over existing configurations that is a single fixture may uniformly cover the entire work surface without spilling the light over the edges (pattern 20) notwithstanding shape and orientation of the surface. Artwork illumination is another application where coherence between target form and the lighting pattern may be desirable. Existing fixtures may utilize multiple LED arrangements alongside complicated optics and apertures to achieve such coherence. FIG. 17 shows fixture 10 highlighting a painting on the wall. This embodiment leverages micro lens technology to achieve a pattern 20 that closely matches the shape of an artwork piece 21 using a single LED source in a compact fixture design.

Figure 18:
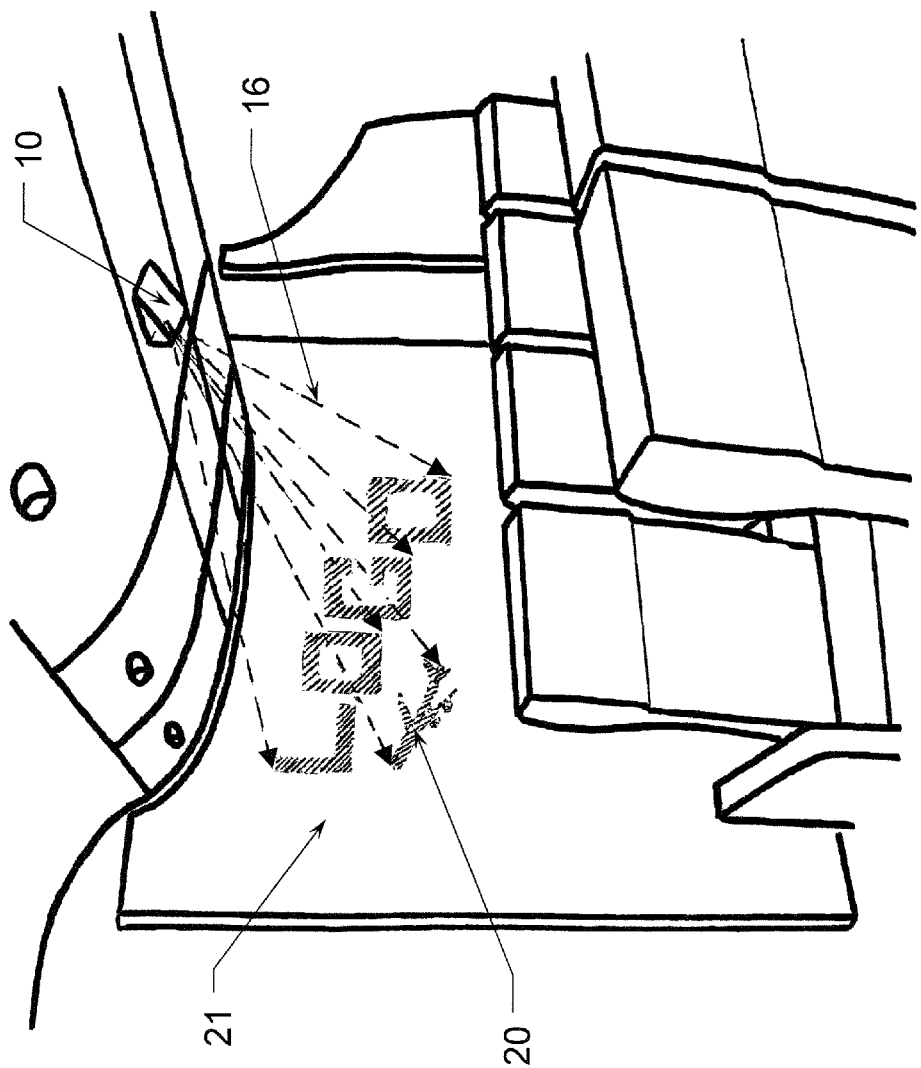
FIG. 18 illustrates one embodiment where a compact LED fixture with micro lens optics is used as a logo light.

Referring now to FIG. 18, plurality of the feature lighting applications can be found in today's premium cabin architectures. Feature lighting may be characterized by complex lighting schemes. Some may include and even combine wash lights, accent lights, logo lights, and other types of decorative illumination. Such variety and complexity may involve complicated fixture arrangements that often require expensive point design. Micro lens technology may be used to create much more simple and repeatable fixture design as one described above that can satisfy most if not all diverse requirements of the feature lighting. Prior art describes certain types of SMLA that are capable of creating not only an arbitrary continuous shape but also a shape with voids (or intentionally dark spots) within a main shape as well as a group of separate shapes. FIG. 18 illustrates one embodiment where fixture 10 is used to form a light pattern 20 with appearance of a logo image composed of several letter-like forms.

While embodiments of the disclosure have been described in terms of various specific embodiments, those skilled in the art will recognize that the embodiments of the disclosure may be practiced with modifications within the spirit and scope of the claims.

What is claimed is:

1. An illumination fixture for an aircraft comprising:
an illumination source, the illumination source having a plurality of LEDs in a plurality of colors;
a communication component coupled to the illumination source to generate variable color light emissions; and
an optical module attached to the illumination source for collection of light emissions from the illumination source and distribution of the collected light emissions over a desired distribution profile, the optical module being adaptive to shape the variable color light emissions to a desired pattern, wherein the optical module comprises:
a collimator lens attached to the illumination source to align the variable color light emissions from the illumination source to form a collimated beam;
a structured micro lens array (SMLA) spatially separated from and in light communication with the collimator lens to distribute the collimated beam over a desired distribution profile, the SMLA positioned approximately planer to the collimated beam exiting the collimator lens; and a reflective device spatially separated from and in light communication with the collimator lens, the reflective device redirecting the collimated beam exiting the collimator lens towards the SMLA, the reflective device at a non-straight angle relative to both the collimator lens and the SMLA.

2. The illumination fixture of claim 1, further comprising an electronic module for powering the illumination source.

3. An illumination system for an aircraft comprising:
a Light Emitting Diode (LED) module comprising a plurality of LEDs in a plurality of colors;
an electronic module coupled to the LED module having a power component to power the LED module and a communication component to send signals to and from the plurality of LEDs in a plurality of colors to generate variable color light emissions;
an optical module coupled to the LED for collection of the variable color light emissions from the plurality of LEDs and distribution of the collected variable color light emissions over a desired area, the optical module being adaptive to shape the variable color light emissions to a desired pattern, wherein the optical module comprises:
a collimator lens attached to the illumination source to align the variable color light emissions from the illumination source to form a collimated beam;
a structured micro lens array (SMLA) spatially separated from the collimator lens to distribute the collimated beam over a desired distribution profile, the SMLA oriented approximately planar to the collimated beam exiting the collimator lens; and
a reflective device spatially separated from the collimator lens and the SMLA, the reflective device redirecting the collimated beam exiting the collimator lens towards the SMLA, the reflective device at a non-straight angle relative to the collimator lens and the SMLA.

4. The illumination system of claim 3, wherein the LED module is integral to one of the electronic module or the optical module.

5. The illumination system of claim 3, wherein the LED module is configured to provide a multiple color light output.

6. An illumination system for an aircraft comprising:
a plurality of light fixtures, wherein each light fixture comprises:
an illumination source installed within a ceiling structure of a cabin of the aircraft comprising a plurality of LEDs in a plurality of colors;
a communication component to send signals to and from the illumination source to generate variable color light emissions; and
an optical module coupled to the illumination source for collection of the variable color light emissions from the illumination source and distribution of the collected variable color light emissions over a desired area, the optical module being adaptive to shape the variable color light emissions to a desired pattern on a ceiling panel surface of the aircraft, wherein the optical module comprises:
a collimator lens attached to the illumination source to align the variable color light emissions from the illumination source to form a collimated beam;
a Structured Micro-Lens Array (SMLA) spatially apart from the collimator lens to distribute the collimated beam over a desired distribution profile, the SMLA oriented approximately parallel to the collimated beam exiting the collimator lens; and
a reflective device spatially apart from the collimator lens and the SMLA for redirecting the collimated beam exiting the collimator lens towards the SMLA, the reflective device being at a non-straight angle relative to both the collimator lens and the SMLA.

7. The illumination system for an aircraft in accordance with claim 6, wherein each light fixture further comprises a power component coupled to the illumination source to power the illumination source.

8. The illumination system of claim 7, further comprising a driver circuit to power the illumination source.

\* \* \* \* \*